(12) United States Patent
Bryan et al.

(10) Patent No.: US 7,174,249 B2
(45) Date of Patent: Feb. 6, 2007

(54) INTELLIGENT DRIVER MODULE FOR CONTROLLING OPERATION OF A FUEL PUMP

(75) Inventors: Lyle Stanley Bryan, Winston-Salem, NC (US); Thomas Michael Banas, High Point, NC (US); John Steven Cowan, Winston-Salem, NC (US)

(73) Assignee: Tyco Electronics Corporation, Middletown, PA (US)

(*) Notice: Subject to any disclaimer, the term of this patent is extended or adjusted under 35 U.S.C. 154(b) by 0 days.

(21) Appl. No.: 11/299,401

(22) Filed: Dec. 12, 2005

(65) Prior Publication Data

US 2006/0200300 A1   Sep. 7, 2006

Related U.S. Application Data

(60) Provisional application No. 60/658,091, filed on Mar. 3, 2005.

(51) Int. Cl.
*F02D 41/22* (2006.01)

(52) U.S. Cl. .................. 701/107; 123/480; 123/198 D

(58) Field of Classification Search ................ 701/107, 701/112, 102, 110, 115; 123/478, 480, 516, 123/520, 198 D
See application file for complete search history.

(56) References Cited

U.S. PATENT DOCUMENTS

| 4,528,952 | A  | * | 7/1985  | Flaig et al. ............. 123/198 D |
| 4,534,328 | A  |   | 8/1985  | Fischer et al. ............. 123/359 |
| 4,602,599 | A  | * | 7/1986  | Glagola .................... 123/179.9 |
| 4,750,463 | A  |   | 6/1988  | Peter et al. ................. 123/479 |
| 6,877,488 | B2 | * | 4/2005  | Washeleski et al. ........ 123/497 |
| 7,055,505 | B2 | * | 6/2006  | Washeleski et al. ........ 123/519 |
| 2002/0148445 | A1 |   | 10/2002 | Doane et al. ............... 123/458 |

FOREIGN PATENT DOCUMENTS

GB      2 244 246 A   * 11/1991

* cited by examiner

*Primary Examiner*—Hieu T. Vo

(57) ABSTRACT

A driver module is provided for controlling operation of a fuel pump of a vehicle. The driver module includes switching circuitry for switching transmission of electrical power to the fuel pump, and a processor for executing a series of programmable instructions for controlling the switching circuitry in accordance with at least one signal received from a restraint control module (RCM) of the vehicle.

20 Claims, 3 Drawing Sheets

INTELLIGENT DRIVER MODULE FOR CONTROLLING OPERATION OF A FUEL PUMP

PRIORITY

This application claims priority to a provisional application filed on Mar. 3, 2005 and assigned U.S. Provisional Application Ser. No. 60/658,091, the entire contents of which are incorporated herein by reference.

BACKGROUND

1. Field

The disclosure relates to driver modules. More particularly, the disclosure relates to an intelligent driver module for controlling operation of a fuel pump.

2. Description of the Related Art

Automobiles require an automatic system to disable the fuel pump in the event of certain emergencies to prevent an increased risk of harm and/or fire. In prior art vehicles a pulse width modulated (PWM) smart fuel pump driver (SFPD) module is provided for driving the fuel pump. A PWM power train control module (PCM) is provided which controls the SFPD module. A separate inertia switch is used to control power to the SFPD module, where the inertia switch controls shut off of power to the fuel pump for disabling the fuel pump in the event of a severe emergency, such as deployment of one or more air bags. The inertia switch is controlled by a restraint control module (RCM) that senses particular emergency conditions, such as airbag deployment. The SFPD module and the inertia switch, as additional components to the automobile, add cost, and require separate packaging, installation and calibration, which are becoming increasingly complicated due to the characteristics of modern vehicle structures.

Once the inertia switch has disabled the fuel pump, the fuel pump remains disabled until the inertia switch is reset. However, the inertia switch may be difficult to access. An average vehicle operator typically requires the assistance of an automobile mechanic to reset the switch, often necessitating towing of the vehicle, regardless of the condition of the vehicle.

A need exists for integration of the functionality of the inertia switch and SFPD module with the PWM driver module. Additionally, a need exists for an operator of the vehicle to be able to intentionally override the disabling of the fuel pump using a method which is not beyond the average skills of an operator.

SUMMARY

An intelligent fuel pump driver (IFPD) module is provided that receives signals from the vehicle's power train control module (PCM) for operating the fuel pump, and from the vehicle's restraint control module (RCM) that are indicative of an event of a severe emergency, e.g., deployment of one or more airbags. The signals from the RCM may further instruct the IFPD module to disable the fuel pump, thus eliminating the need for a separate inertia switch. The occurrence of disabling of the fuel pump is stored and time stamped in a memory of the IFPD module. An operator of the vehicle may override disablement of the fuel pump via intentional operator actions. Security walls are provided for ensuring that signals received from the PCM and RCM are reliable. Furthermore, the IFPD module outputs a status signal indicating the status of communications with the PCM and/or RCM, content of signals received by the IFPD module and/or the status of power transmission to the fuel pump.

In accordance with one aspect of the present disclosure there is provided a driver module for controlling operation of a fuel pump of a vehicle. The driver module includes switching circuitry for switching transmission of electrical power to the fuel pump, and a processor for executing a series of programmable instructions for controlling the switching circuitry in accordance with at least one signal received from a restraint control module (RCM) of the vehicle.

Pursuant to yet another aspect of the present disclosure, a vehicle is provided having an RCM generating at least one signal upon the occurrence of an emergency condition; a fuel pump for pumping fuel, and a driver module. The driver module includes an interface with the RCM for receiving at least one RCM signal generated by the RCM, including at least one signal indicative of an emergency condition; switching circuitry for generating an output signal for switching transmission of electrical power to the fuel pump; and a processor controlling the generation of the output signal in response to receipt of the at least one signal from the RCM indicative of an emergency condition for disabling transmission of power to the fuel pump.

Pursuant to yet another aspect of the present disclosure, there is provided a method for controlling power transmission to a fuel pump of a vehicle. The method includes receiving at least one signal from a restraint control module (RCM) of the vehicle, generating an output signal for switching power transmission to the fuel pump, and controlling the generation of the output signal in accordance with the at least one signal received from the RCM.

BRIEF DESCRIPTION OF THE DRAWINGS

Various embodiments of the disclosure will be described herein below with reference to the figures wherein.

DETAILED DESCRIPTION OF THE PREFERRED EMBODIMENTS

In a preferred embodiment of the present disclosure, an intelligent fuel pump driver (IFPD) module is disclosed that allows the vehicle's restraint control module (RCM) to disable the fuel pump. The functionality provided by a prior art inertia switch and a prior art smart fuel pump driver module is replaced by the IFPD module. Furthermore, the IFPD module of the present disclosure provides functionality additional to the functionality previously provided by the prior art inertia switch and the prior art smart fuel pump driver module. In accordance with the present disclosure, the IFPD module is integrated with the vehicle's power train control module (PCM) and RCM for receiving signals from the vehicle's PCM and RCM. The signals received from the PCM include signals for controlling power transmission to the fuel pump for controlling when fuel is dispensed by the fuel pump.

Upon the occurrence of a severe emergency condition, e.g., deployment of one or more airbags, the RCM generates and transmits signals notifying the IFPD module of the emergency condition. The RCM may further instruct the IFPD module to disable the fuel pump upon the occurrence of the event. The IFPD module disables power transmission to the fuel pump in response to instructions from the RCM to disable the fuel pump (i.e., stop operation of the fuel pump). Each instance of disabling of the fuel pump is stored and time stamped in a memory of the IFPD module.

An operator of the vehicle may override disablement of the fuel pump by taking a specified intentional action, which may include a series and/or combination of actions that are not likely to occur accidentally or randomly, such as by performing at least two consecutive key-on (e.g., turning an ignition key in the ignition) operations. Security walls are provided for ensuring that signals received from the PCM and RCM are reliable. Furthermore, the IFPD module module outputs a status signal to the PCM indicating the status of communications with the PCM and/or RCM, content of signals received by the IFPD module and/or the status of power transmission to the fuel pump.

Figure 1:
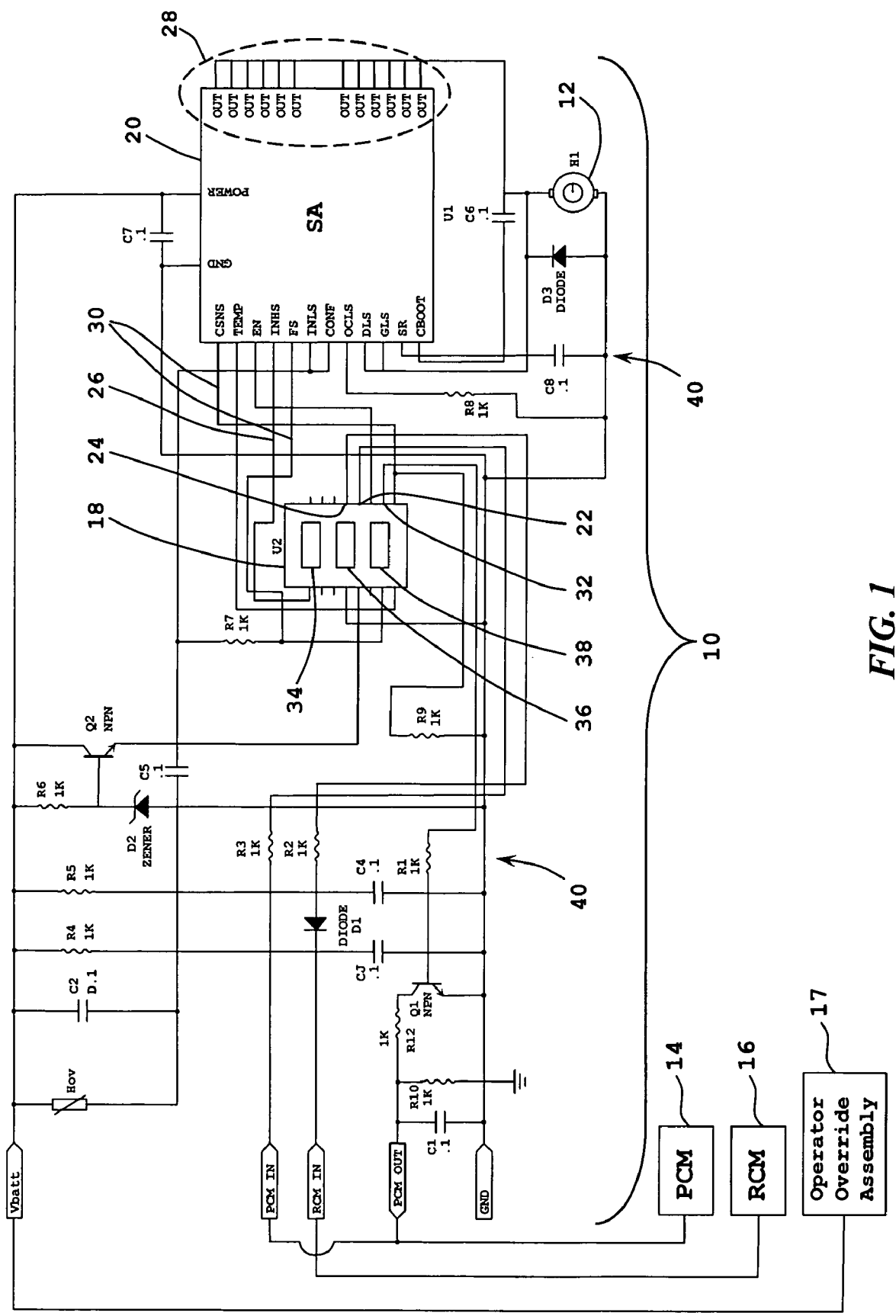
FIG. 1 shows a schematic of a preferred embodiment of the present disclosure.

Reference should be made to the drawings where like reference numerals refer to similar elements throughout the various figures. FIG. 1 shows an exemplary, schematic circuit of an IFPD module 10 in accordance with the present disclosure (hereinafter IFPD 10). The IFPD 10 controls transmission of electrical power to fuel pump 12 in response to signals received from a PCM 14 and an RCM 16 and/or another controlling or overriding module, such as an operator override assembly 17. The PCM 14 and RCM 16 may each include one or more units. The IFPD 10 is preferably a modulated driver module, which is exemplified below as a pulse width modulated driver, but may be otherwise modulated, such as by frequency. The exemplary IFPD 10 includes a microcontroller 18 and a switching assembly (SA) 20 (also referred to as switching circuitry).

In a typical application, the PCM 14 controls the amount of power transmitted to the fuel pump 12 by generating PCM_IN signals and sending the PCM_IN signals to the IFPD 10. In the exemplary embodiment of the disclosure shown in FIG. 1, the PCM_IN signals are frequency pulse width modulated (PWM) low current signals. The PCM 14 encodes the PCM_IN signals in accordance with a predetermined encodation scheme by selecting the period and duty cycle to indicate the duration of time the fuel pump should be enabled. The frequency of the PCM_IN signals must be within a predetermined frequency range in order for the IFPD 10 to treat them as valid signals.

When the duty cycle of a received PCM_IN signal falls within a first range (4–51% in the present example), it is indicated that the PCM_IN is ON, and the PCM 14 is requesting that power be transmitted to the fuel pump 12 for operating the fuel pump 12. The duty cycle of the received PCM_IN signal indicates the amount of fuel being requested and determines the duty cycle of a command signal controlling operation of the fuel pump 12 (described further below). Hence, the duration of time that the fuel pump 12 is operated per period of the command signals operating the fuel pump 12 is determined by the duty cycle of the received PCM_IN signal. When the duty cycle of the received PCM_IN signal falls within a second range (52–67% in the present example), it is indicated that PCM_IN is OFF, and the PCM 14 is requesting that no power be transmitted to the fuel pump 12 until receipt of a PCM_IN ON signal.

The RCM 16 generates RCM_IN signals for informing the IFPD 10 whether or not an emergency condition has occurred (e.g., airbag deployment) and/or for commanding disablement of the fuel pump 12. In the example provided, the RCM_IN signals are frequency PWM low current signals. The RCM 16 encodes the RCM_IN signals in accordance with a predetermined encodation scheme, preferably by selecting the frequency to indicate the content of the message.

In the present example, three types of RCM_IN signals are generated by the RCM 16. The first type of RCM_IN signal has a first frequency (10 Hz in the present example) indicating that conditions are normal and the fuel pump 12 should be controlled by the PCM_IN signals. The first type of RCM_IN signal is referred to below as "Normal PCM Control". The second type of RCM_IN signal has a second frequency (250 Hz in the present example) indicating that an RCM event has occurred due to detection of an emergency condition; however disablement of the fuel pump 12 is not yet requested. The second type of RCM_IN signal is referred to below as "Event Occurred". In the present example, the duty cycle of the first and second types of the RCM_IN signal is 50%.

The third type of RCM_IN signal has a third frequency (500 Hz in the present example), indicating that an RCM override has occurred and the RCM 16 is requesting that the fuel pump 12 be disabled. The third type of RCM_IN signal is referred to below as "Override and Disable". In accordance with the present example, in order to prevent unintentional disablement of the fuel pump 12, the IFPD 10 only disables the fuel pump 12 upon receipt of the second type of RCM_IN signal, followed by receipt of two consecutive periods of third type of RCM_IN signals, where the two consecutive periods of third type of RCM_IN signals are received within a predetermined time interval (which is 10 msec in the present example).

In accordance with the example shown in FIG. 1, the PCM_IN signals are received by the IFPD 10 at a first interface 22 and the RCM_IN signals are received at a second interface 24, each shown as a predetermined pin of the microcontroller 18. The microcontroller 18 decodes received PCM_IN signals based on the encodation scheme of the vehicle's PCM 14. In accordance with the decoding, the microcontroller 18 encodes and generates a switching control signal which is transmitted to the SA 20. Preferably, the switching control signal is a high power frequency PWM signal. In accordance with the present example, the switching control signal is a 9.6 KHz signal. For example, the switching control signal is encoded as twice the duty cycle of the PWM signal as a 9.6 KHz signal.

The switching control signal is encoded by selecting its period and duty cycle so that the HIGH portion of the duty cycle is adjusted in accordance with the duty cycle of incoming PCM_IN signals. When the switching control signal is ON, the HIGH portion is proportional to the amount of fuel requested by the PCM_IN signals. The switching control signal is OFF and remains LOW through its entire period when the RCM_IN signals indicate that the RCM 16 has requested disablement of the fuel pump 12, unless an enable override signal has been received by the IFPD 10. A transmission path 26 is shown along which the switching control signal is transmitted from the microcontroller 18 to the SA 20. Communication between the microcontroller 18 and the SA 20 may be wired or wireless.

The SA 20 outputs a fuel pump output signal in response to receipt of the switching control signal. The duty cycle of the fuel pump output signal is proportional to the switching control signal. The fuel pump output signal is output to the fuel pump 12 via a third interface 28, shown as set of predetermined pins of the SA 20. When the fuel pump output signal is HIGH, power transmission to the fuel pump 12 is switched ON, and when the fuel output signal is LOW, power transmission to the fuel pump 12 is switched OFF.

The IFPD 10 checks validity of the incoming PCM_IN and RCM_IN signals by checking the frequency and/or duty cycle of the incoming signals. Furthermore, once the fuel pump 12 is disabled, the IFPD 10 checks for receipt of an enable override signal (which may include a sequence or combination of signals). The enable override signal is generated upon occurrence of an enable override condition, such as a combination or sequence of one or more operator override actions.

In the present example, the enable override signal is generated by the operator override assembly 17. The operator override assembly 17 is exemplified as an ignition assembly, where an operator override action includes turning the key in the ignition more than once, such as within a predetermined time period, which causes generation of at least two consecutive KEY_ON signals.

Other enable override conditions are within the scope of the present disclosure, such as receipt of a signal from a remote processor, different combinations or sequences of operator override actions, etc. In the present example, upon receipt of more than one enable override signal, the IFPD 10 overrides disablement of the fuel pump 12 and transmits power to the fuel pump 12 in accordance with received PCM_IN signals.

Furthermore, status of electrical communication between the SA 20 and the fuel pump 12 is determined, and the IFPD 10 checks the determined status. In the example of the present invention, the IFPD 10 determines the status of the electrical communication between the SA 20 and the fuel pump 12. More specifically, the SA 20 internally checks the current and/or voltage of at least one signal indicative of power transmission to the fuel pump 12, and the results are provided to the microcontroller 18 via at least one feedback signal 30.

A first feedback signal of the at least one feedback signal 30 is an analog feedback signal that is proportional to the current being sourced to the fuel pump 12. A second feedback signal of the at least one feedback signal 30 is an analog feedback signal that is proportional to the voltage being sourced to the fuel pump 12. The first and second signals are generated by the SA 20 and provided to the microcontroller 18. The microcontroller 18 reads the first and second feedback signals when the power transmission to the fuel pump 12 is switched on for determining if there is an open circuit between the IFPD 10 and the fuel pump 12, an over voltage condition and/or an under voltage condition. When the microcontroller 18 determines that the feedback signal 30 indicates an unacceptable current or voltage condition for power transmission to the fuel pump 12, the microcontroller 18 sends a switching control signal to the SA 20 for disabling power transmission to the fuel pump 12.

Respective instances of disablement of the fuel pump 12 are time stamped and stored in a memory, e.g., flash memory, where the memory is included with or accessible to the microcontroller 18 of the IFPD 10. If the disablement of the fuel pump 12 is overridden, the operator may be operating the vehicle without viable airbags. The time stamped stored event of the disablement of the fuel pump 12 may be used for various purposes, such as investigation of an accident or freeing the manufacturer of the vehicle from liability of operation of the vehicle without viable airbags.

The IFPD 10 generates a status message which is indicative of validity and/or content of received PCM_IN and RCM_IN signals and the status of electrical communication between the SA 20 and the fuel pump 12. The microcontroller 18 encodes the status message, which is sent via a fourth interface 32 of the IFPD 10 to another device, such as the PCM 14. In the present example, the fourth interface 32 is a predetermined pin of the microcontroller 18. The status message may be a PWM signal. In the present example, the status message is output at a fixed frequency, and the duty cycle is encoded to indicate the content of the status message. Exemplary status message contents may include notification of detection of an error in a received PCM_IN or RCM_IN signal, existence of an emergency condition; disablement of power transmission to the fuel pump 12, detection of faulty electrical communication between the SA 20 and the fuel pump 12, and/or normal function for power transmission to the fuel pump 12 in accordance with received PCM_IN signals.

The IFPD 10 is preferably packaged as a plug-in device. For example, the IFPD is packaged as a 6 pin 280 universal plug-in device. The microcontroller 18 is preferably an integrated circuit (IC), such as a commercially available 8-bit microcontroller packaged in a 16 pin small outline integrated circuit (SOIC). The microcontroller 18 includes at least one processor 34 and at least one storage device 36, such as RAM, ROM, flash RAM, etc., accessible by the at least one processor 34. A controller software module 38 including a series of programmable instructions executable by the at least one processor 34 is stored on the at least one storage device 36. Furthermore, the series of programmable instructions may be transmitted via propagated signals for execution by the at least one processor 34 for performing the functions described herein and to achieve a technical effect in accordance with the disclosure.

The SA 20 is preferably a pulse width modulated IC having at least one switching device which is controlled by the microcontroller 18 to switch power to the fuel pump 12, such as a commercially available high side driver employing at least one field effect transistor (FET) switching device. Power is provided to the IFPD 10 and the fuel pump 12 via a Vbatt signal. A KEY_ON signal is generated when the ignition is started. Generation of the KEY_ON signal allows the Vbatt signal to be delivered to the SA 20. The voltage of the Vbatt when on is typically 12V. Additional electrical devices 40 may be provided for establishing viable circuitry within the IFPD 10. The additional circuitry 40 includes, for example, pull-down resistors, filtering circuitry, voltage and/or current protection circuitry, slew rate control, transient protection circuitry, voltage and circuitry for providing the appropriate amount of power to the microcontroller 18 and SA 20.

Figure 2A:
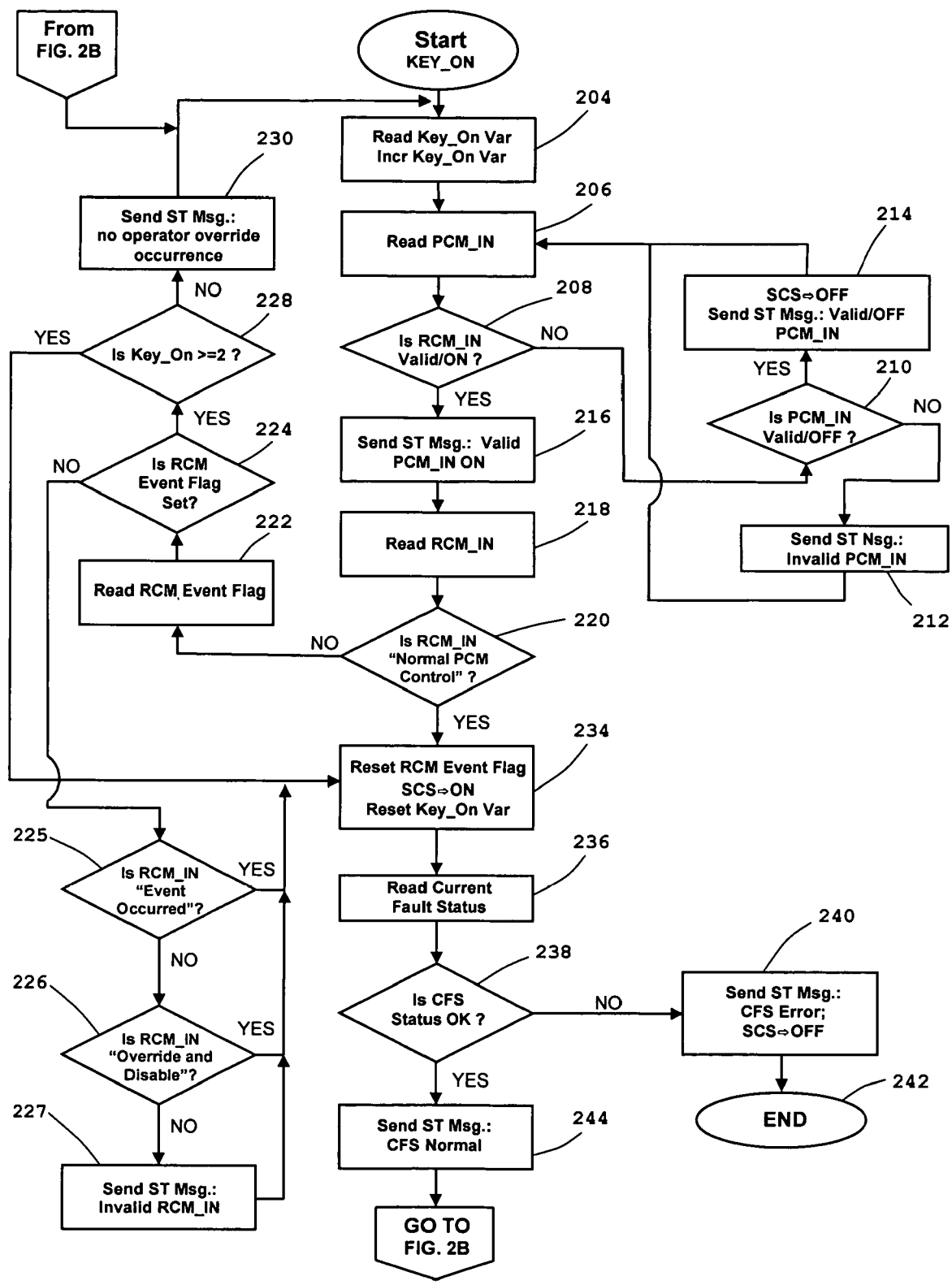
FIGS. 2A and 2B show a firmware flow diagram in accordance with the present disclosure.
Figure 2B:
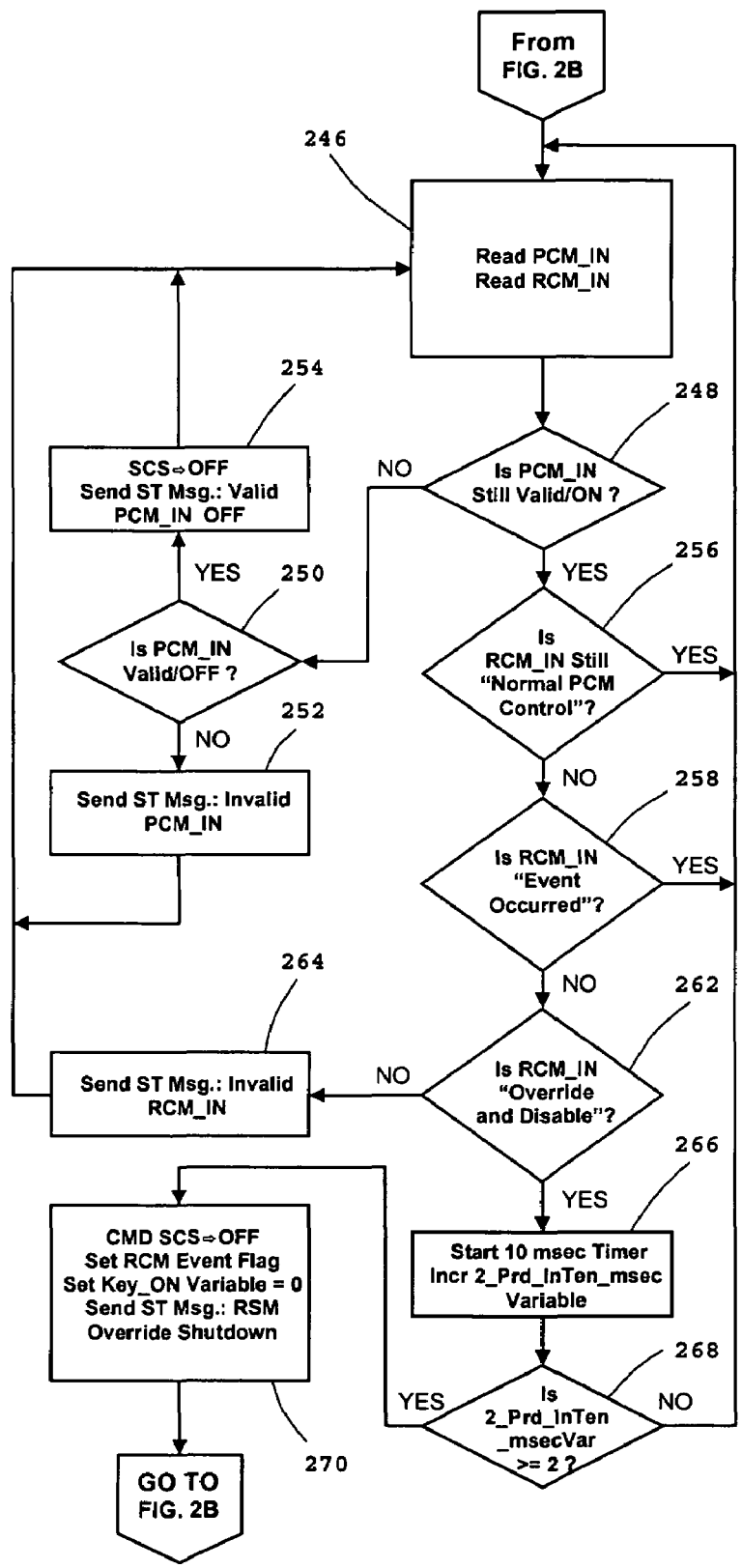

FIGS. 2A and 2B shows exemplary steps performed by the at least one processor 34 upon execution of the controller software module 38. As shown in FIG. 2, the status message is processed in a main polling loop of the control software module 38 executed by the microcontroller 18, and is not interrupt driven. At step 202, the main polling loop begins upon receipt of a KEY_ON signal, indicating that the operator has turned the key in the ignition. At step 204, a Key_On variable is read and incremented, which will occur each time the ignition key is turned in the ignition by the operator. At step 206, a received PCM_IN signal is read.

At determination step 208, a determination is made if the PCM_IN signal is valid and ON. The validity determination of the PCM_IN ON signal includes checking if the frequency of the received PCM_IN signal is within a predetermined frequency range. Additionally, at this step the duty cycle of the PCM_IN signal is checked to determine if the PCM_IN signal is ON. If the PCM_IN signal is not valid and is not ON, determination step 210 is executed.

At step 210, a determination is made if the PCM_IN is valid and OFF. The validity determination of the PCM_IN OFF signal includes checking if the frequency of the received PCM_IN signal is within a predetermined frequency range and checking the duty cycle of the PCM_IN signal to determine if the PCM_IN signal is OFF. If the PCM_IN signal is not valid and is not OFF, step 212 is executed in which a status message (ST Msg) is sent at a predetermined frequency (1 Hz in the current example) with a predetermined duty cycle (DC) (25% in the current example) indicating that an invalid PCM_IN signal was received, after which step 206 is executed. If the determination at step 210 indicates that the PCM_IN signal is valid and is OFF, then step 214 is executed.

At step 214, a switching control signal (SCS) OFF is sent from the microcontroller 18 to the SA 20 to disable power to the fuel pump 12, and a status message is sent at the predetermined frequency (e.g., 1 Hz) with a predetermined duty cycle (50% in the current example) indicating that a valid PCM_IN OFF signal was received, after which step 206 is executed.

If the determination at step 208 was positive, step 216 is executed. At step 216, a status message is sent at the predetermined frequency (e.g., 1 Hz) with a predetermined duty cycle (50% in the current example) indicating that a valid PCM_IN ON signal was received. Next step 218 is executed, in which a received RCM_IN signal is read (including decoded). At determination step 220, a determination is made if the frequency of the RCM_IN signal indicates that the RCM_IN signal is a "normal PCM control" signal (e.g., the frequency is 10 Hz), indicating that power transmission to the fuel pump 12 is determined in accordance with incoming PCM_IN signals. Furthermore, the duty cycle of the RCM_IN signal may be checked for determining if the RCM_IN signal is valid (e.g., the duty cycle is 50%). If the determinations performed at step 220 are negative, then step 222 is executed.

At step 222, an RCM event flag is read. Setting of the RCM event flag is discussed further below, with respect to step 270. Next, at step 224, a determination is made if the RCM event flag is set. If NO, determination step 225 is executed. At step 225, a determination is made if the frequency of the RCM_IN signal indicates that the RCM_IN signal is an "event occurred" signal (e.g., the frequency is 250 Hz), indicating that the RCM 16 has detected the occurrence of an event. If YES, then step 234 is executed, and if NO, determination step 226 is executed.

At step 226, a determination is made if the frequency of the RCM_IN signal indicates that the RCM_IN signal is an "override and disable" signal (e.g., the frequency is 500 Hz), indicating that the RCM 16 is overriding control of the fuel pump 12 by the PCM 14, and is requesting disablement of transmission of power to the fuel pump 12. If YES, then step 234 is executed, and if NO, step 227 is executed. At step 227, a status message is sent at the predetermined frequency (e.g., 1 Hz) with a predetermined duty cycle (40% in the current example) indicating that an invalid RCM_IN signal was received.

If it is determined at step 224 that the RCM event flag is set, determination step 228 is executed. At step 228, a determination is made if the Key_On≧2. If YES, step 234 is executed, otherwise, step 230 is executed. At step 230, an appropriate status message is sent at the predetermined frequency (e.g., 1 Hz) with a predetermined duty cycle (80% in the current example) indicating that an operator override did not occur. Next, step 204 is executed. It is possible that an Under Voltage Fault Status is read, before continuing with execution of step 204. After reading the and that Under Voltage Fault Status, an appropriate status message is sent indicating the state of the Under Voltage Fault Status that was read and control of execution is directed to an appropriate step At step 234, the RCM event flag is reset, the Key_On variable is reset and a switching control signal ON is encoded (e.g., as 2*(DC of the PCM) at 9.6 KHz) and sent from the microcontroller 18 to the SA 20 for switching power to the fuel pump 12. At step 236, a Current Fault Status is read, e.g., by checking the first feedback signal of the at least one feedback signal 30. At determination step 238, a determination is made if the Current Fault Status is acceptable. If not, step 240 is executed.

At step 240, a status message is sent at the predetermined frequency (e.g., 1 Hz) with a predetermined duty cycle (80% in the current example) indicating that a current fault status error occurred. A switching control signal OFF is sent from the microcontroller 18 to the SA 20 to disable power to the fuel pump 12, followed by execution of an End step at step 242. Otherwise, if the Current Fault Status is acceptable, step 244 is executed. At step 244, a status message is sent at the predetermined frequency (e.g., 1 Hz) with a predetermined duty cycle (60% in the current example) indicating that the output from the SA 20 is normal; indicating that electrical communication between the SA 20 and the fuel pump 12 is acceptable.

Next, step 246 is executed. At step 246, the next received PCM_IN and RCM_IN signals are read. At determination step 248, a determination is made if PCM_IN is still valid and ON. If not, determination step 250 is executed. At step 250, a determination is made if PCM_IN is valid and OFF. If not, step 252 is executed in which a status message is generated at 1 Hz with a predetermined duty cycle indicating that the PCM_IN signal is invalid, after which step 246 is executed. If at step 250 it is determined that PCM_IN is valid and OFF, step 254 is executed. At step 254, a switching control signal OFF is sent from the microcontroller 18 to the SA 20 to disable power to the fuel pump 12, and a status message is sent at 1 Hz with a predetermined duty cycle indicating that a valid PCM_IN OFF signal was received. After execution of step 254, step 246 is executed.

If the determination of step 248 was positive, determination step 256 is executed. At step 256, a determination is made if the RCM_IN signal is still valid and the frequency of the RCM_IN signal indicates that the RCM_IN signal is a "normal PCM control" signal (e.g., the frequency is 10 Hz), indicating that power transmission to the fuel pump 12 is determined in accordance with incoming PCM_IN signals. If YES, step 246 is executed. Otherwise, determination step 258 is executed. At step 258, it is determined if an RCM event occurred, which is indicated by the RCM_IN signal having a frequency (e.g., 250 Hz) indicating that the RCM signal is an "event occurred signal". If YES, step 246 is executed. If NO, determination step 262 is executed.

At step 262, a determination is made if the RCM_IN signal has a frequency a (e.g., 500 Hz), indicating that the RCM signal is an "override and disable" signal. If not, step 264 is executed, in which a status message is sent having the predetermined frequency (e.g., 1 Hz) with a predetermined duty cycle (e.g., 40%) indicating that an invalid RCM signal or sequence of RCM signals was received. Execution of step 264 is followed by execution of step 246. If the determination of step 262 is positive, step 266 is executed. At step 266, a timer is started (a 10 msec timer in the present example), and, a 2_Prd_InTen_msec variable is incremented, where the 2_Prd_InTen_msec variable counts the number of passes through step 266 in less than a 10 msec interval.

At determination step 268 a determination is made if 2_Prd_InTen_msec≧2 before the end of the 10 msec interval. If YES, step 270 is executed. At step 270, a switching control signal OFF is sent from the microcontroller 18 to the SA 20 to disable power to the fuel pump 12, a status message is sent at the predetermined frequency (e.g., 1 Hz) with a predetermined duty cycle (80% in the current example) indicating that an RCM override occurred for disabling the fuel pump 12, the RCM event flag is set to zero, and Key_On is reset to zero. Otherwise, if the determination at step 268 is negative, step 246 is executed. In accordance with the algorithm described by the flowchart, the override and disable operation performed at step 270 is only executed after receipt of an RCM "event occurred" message followed by receipt of two RCM "override and disable" messages within two consecutive 10 msec time periods.

Accordingly, the IFPD 10 controls power transmission to the fuel pump 12 in accordance with signals provided by the PCM 14, and allows for overrides by the RCM 16 for disabling the fuel pump 12. A specific sequence of valid RCM signals is required for performing an RCM override to prevent an unintentional RCM override. Furthermore, the IFPD 10 allows for an enable override for overriding an RCM override and enabling transmission of power to the fuel pump 12 in accordance with signals provided from the PCM 14. A specific sequence of enable override signals is required for performing an enable override to prevent an unintentional enable override. Status messages are provided to the PCM 14 so that the PCM 14 becomes aware of invalid messages, faulty power transmission to the fuel pump 12 and RCM overrides.

The described embodiments of the present invention are intended to be illustrative rather than restrictive, and are not intended to represent every embodiment of the present invention. Various modifications and variations can be made without departing from the spirit or scope of the invention as set forth in the following claims both literally and in equivalents recognized in law.

The invention claimed is:

1. A vehicle comprising:
    a restraint control module (RCM) generating at least one signal upon the occurrence of an emergency condition;
    a fuel pump for pumping fuel; and
    a driver module comprising:
    an interface with the RCM for receiving at least one RCM signal generated by the RCM, including at least one signal indicative of an emergency condition;
    switching circuitry for generating an output signal for switching transmission of electrical power to the fuel pump; and
    a processor controlling the generation of the output signal in response to receipt of the at least one signal from the RCM indicative of an emergency condition for disabling transmission of power to the fuel pump.

2. The vehicle in accordance with claim 1, wherein:
    the vehicle further comprises a power train control module (PCM) generating at least one signal requesting transmission of power to the fuel pump; and
    the driver module further comprises an interface with the power train control module (PCM) for receiving the at least one signal generated by the PCM; and the processor further controls the switching device in accordance with the at least one signal received from the PCM, unless the at least one signal indicative of an emergency condition is received.

3. The vehicle in accordance with claim 2, the driver module further generates at least one status message indicating at least one of a status of at least one signal received by at least one of the interface with the RCM and the interface with the PCM, and a status of electrical communication between the switching circuitry and the fuel pump, and transmits the at least one status message to an external device with respect to the driver module.

4. The vehicle in accordance with claim 2, further comprising an operator override assembly for generating an enable override signal for overriding of disablement of power transmission to the fuel pump;
    wherein the driver module overrides disablement of power transmission to the fuel pump upon receipt of the enable override signal including controlling transmission of power to the fuel pump in accordance with the at least one signal received from the PCM.

5. The vehicle in accordance with claim 1, wherein an instance of disabling power transmission to the fuel pump is time stamped and stored in a memory accessible by the driver module.

6. A driver module for controlling operation of a fuel pump of a vehicle, the driver module comprising:
    switching circuitry for switching transmission of electrical power to the fuel pump; and
    a processor for executing a series of programmable instructions for controlling the switching circuitry in accordance with at least one signal received from a restraint control module (RCM) of the vehicle.

7. The driver module in accordance with claim 1, wherein the execution of the series of programmable instructions further includes controlling the switching circuitry in accordance with at least one signal received from a power train control module (PCM) of the vehicle.

8. The driver module in accordance with claim 7, wherein execution of the series of programmable instructions further includes:
    generating at least one status message indicating at least one of a status of at least one signal received from the RCM and from the PCM, and a status of electrical communication between the switching circuitry and the fuel pump; and
    transmitting the at least one status message to an external device.

9. The driver module in accordance with claim 8, wherein the at least one status message is a pulse width modulated (PWM) signal.

10. The driver module in accordance with claim 7, wherein execution of the series of programmable instructions further includes verifying validity of signals of the at least one signal received from the PCM and the at least one signal received from the RCM.

11. The driver module in accordance with claim 7;
    wherein the at least one signal received from the RCM includes at least one signal indicative of an emergency condition; and
    execution of the series of programmable instructions further includes:
    controlling the switching circuitry to disable power transmission to the fuel pump in response to receipt of the at least one signal from the RCM indicative of an emergency condition; and
    controlling the switching device to override the disablement of power transmission to the fuel pump upon receipt of an enable override signal, including transmitting power to the fuel pump in accordance with the at least one signal received from the PCM.

12. The driver module in accordance with claim 1, wherein the at least one signal received from the RCM includes at least one signal indicative of an emergency condition; and
execution of the series of programmable instructions further includes controlling the switching circuitry to disable power transmission to the fuel pump in response to receipt of the at least one signal from the RCM indicative of the emergency condition.

13. The driver module in accordance with claim 12, wherein an instance of disabling power transmission to the fuel pump is time stamped and stored in a memory accessible by the processor.

14. The driver module in accordance with claim 1, wherein the at least one signal received from the RCM is a PWM signal.

15. A method for controlling power transmission to a fuel pump of a vehicle, the method comprising:
receiving at least one signal from a restraint control module (RCM) of the vehicle;
generating an output signal for switching power transmission to the fuel pump; and
controlling the generation of the output signal in accordance with the at least one signal received from the RCM.

16. The method in accordance with claim 15, further comprising:
receiving at least one signal from a power train control module (PCM);
wherein the controlling step further comprises controlling the generation of the output signal in accordance with the at least one signal received from the PCM.

17. The method in accordance with claim 16, wherein:
the at least one signal received from the RCM includes at least one signal indicative of an emergency condition; and
the controlling step further comprises overriding controlling the generation of the output signal in accordance with the at least one signal received from the PCM in response to receipt of the at least one signal received from the RCM indicative of an emergency condition, including disabling power transmission to the fuel pump.

18. The method in accordance with claim 17, further comprising recording and time stamping an instance of disabling power transmission to the fuel pump.

19. The method in accordance with claim 17, further comprising receiving an enable override signal that requests overriding of disablement of the fuel pump;
wherein the controlling step further comprises overriding disablement of the fuel pump including controlling generation of the output signal in accordance with the at least one signal received from the PCM upon receipt of the enable override signal.

20. The method in accordance with claim 16, further comprising of:
generating at least one status message indicating status of at least one signal received from at least one of the RCM and the PCM, and an operating status of the fuel pump; and
transmitting the at least one status message to a device.

* * * * *